United States Patent
Choi et al.

(10) Patent No.: US 9,124,997 B2
(45) Date of Patent: Sep. 1, 2015

(54) APPARATUS AND METHOD FOR REMOTELY CONTROLLING IN MOBILE COMMUNICATION TERMINAL

(75) Inventors: Yoon-Suk Choi, Gyeonggi-do (KR); Gi-Tae Mun, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 236 days.

(21) Appl. No.: 13/304,894

(22) Filed: Nov. 28, 2011

(65) Prior Publication Data

US 2012/0157076 A1 Jun. 21, 2012

(30) Foreign Application Priority Data

Dec. 15, 2010 (KR) .................. 10-2010-0128490

(51) Int. Cl.
| | |
|---|---|
| H04M 3/00 | (2006.01) |
| H04B 7/00 | (2006.01) |
| G06F 15/16 | (2006.01) |
| H04W 4/00 | (2009.01) |
| H04W 76/02 | (2009.01) |
| H04L 29/08 | (2006.01) |
| G06F 17/30 | (2006.01) |

(52) U.S. Cl.
CPC ............ *H04W 4/00* (2013.01); *G06F 17/30575* (2013.01); *H04L 67/025* (2013.01); *H04L 67/06* (2013.01); *H04L 67/104* (2013.01); *H04L 67/1095* (2013.01); *H04L 67/2857* (2013.01); *H04W 76/02* (2013.01)

(58) Field of Classification Search
CPC ........ H04W 4/00; H04W 76/02; H04L 67/06; H04L 67/025; H04L 67/104; H04L 67/1095; H04L 67/2857; G06F 17/30575

USPC .......... 455/41.2, 566, 418–420; 709/227–237
See application file for complete search history.

(56) References Cited

U.S. PATENT DOCUMENTS

| | | | |
|---|---|---|---|
| 2006/0236250 A1* | 10/2006 | Gargi ............................ | 715/753 |
| 2007/0019595 A1* | 1/2007 | Huh et al. ..................... | 370/338 |
| 2007/0115346 A1* | 5/2007 | Kim et al. ................. | 348/14.02 |
| 2007/0271239 A1* | 11/2007 | Zhang et al. ...................... | 707/3 |
| 2007/0294368 A1* | 12/2007 | Bomgaars et al. ............ | 709/217 |
| 2008/0045142 A1* | 2/2008 | Kim ................................. | 455/7 |
| 2008/0311852 A1* | 12/2008 | Hansen et al. ............... | 455/41.2 |
| 2009/0150251 A1* | 6/2009 | Zhitomirsky ................... | 705/26 |
| 2009/0183088 A1* | 7/2009 | Saka ............................. | 715/751 |
| 2009/0228792 A1* | 9/2009 | van Os et al. ................ | 715/702 |
| 2010/0146388 A1* | 6/2010 | Makela et al. ................ | 715/702 |
| 2010/0177156 A1* | 7/2010 | Kim et al. .................. | 348/14.02 |
| 2011/0081923 A1* | 4/2011 | Forutanpour et al. ......... | 455/457 |
| 2011/0162048 A1* | 6/2011 | Bilbrey et al. .................... | 726/4 |
| 2011/0295959 A1* | 12/2011 | Martin et al. ................. | 709/206 |

* cited by examiner

*Primary Examiner* — Michael Mapa
(74) *Attorney, Agent, or Firm* — Cha & Reiter, LLC.

(57) ABSTRACT

An apparatus and a method for remote control at a mobile communication terminal includes a display unit that outputs a remote control screen when a remote control event occur; a communication unit either transmits or receives a remote control signal to or from an object terminal as well as data for storage when a remote control event occurs; a remote control processor processes the remote control signal received from the communication unit, and controls either the transmitting or receiving of data for storage; and a controller controls the remote control processor according to the received remote control signal, so as to transmit a storage data transmission or reception request message to the object terminal in response a respective on of a transmission or a reception request for the data for storage.

10 Claims, 9 Drawing Sheets

APPARATUS AND METHOD FOR REMOTELY CONTROLLING IN MOBILE COMMUNICATION TERMINAL

CLAIM OF PRIORITY

This application claims the benefit of the earlier filing date, under 35 U.S.C. §119(a), of a Korean patent application filed in the Korean Intellectual Property Office on Dec. 15, 2010 and assigned Serial No. 10-2010-0128490, the entire disclosure of which is hereby incorporated by reference.

BACKGROUND OF THE INVENTION

1. Field of the Invention

The present invention relates to an apparatus and a method for remote control between mobile communication terminals. More particularly, the present invention relates to an apparatus and a method for remotely controlling a mobile communication terminal, which is adapted to be able to one of either transmit or receive data for storage between terminals, while also performing a remote control event.

2. Description of the Related Art

As mobile communication terminals rapidly develop, the mobile communication terminal is evolving into a terminal capable of performing various additional functions while maintaining the basic functions of wireless voice communication and information exchange.

The mobile communication terminal enables a user to perform web surfing with introduction of the wireless Internet, enables a user to capture an image with introduction of a digital camera, and transmits a captured image file to a different terminal via the Internet network as well as performing a basic function of voice communication with a counterpart mobile terminal.

Furthermore, a mobile communication terminal can be used for accessing a specific server and receiving a service. Recently, because the mobile communication terminal can generate and store various contents, and includes a large capacity storage unit so that a large capacity of data can be processed, the mobile communication terminal emerges as a useful service tool. In addition, as the processing ability and network speed improve, the possible uses as a service tool increases even more.

Additionally, a remote control function operable between terminals is also emerging. For example, as part of the remote control, an access between the same operating systems realized in a personal computer (PC) exists. In remote control between PCs, a control PC may access a target PC as an object to directly view a screen of the accessed PC, and may directly execute a program. In addition, the control PC may use a peripheral device of the accessed PC, receive a result thereof, and connect the peripheral device with a peripheral device of the control PC and use the same.

The above-described remote control function may be applied between mobile communication terminals. For example, a control terminal may share a screen and voice of a controlled terminal via an authentication procedure and simultaneously, control a function of the controlled terminal.

However, the above-described remote control function of the mobile communication terminal only shares a screen and voice of the controlled terminal, and does not provide a function of receiving data for storage (for example, a file, etc.) inside the controlled terminal, or transmitting the data for storage which is inside the controlled terminal, to the control terminal. Accordingly, in the event of urgently transmitting or receiving of the data for storage, the terminal is inconvenient because it must connect to an Internet network for transmission or reception of data for storage.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for providing remote control at a mobile communication terminal, which is adapted to one of transmit or receive data for storage with another mobile communication terminal while performing a remote control event.

Another aspect of the present invention is to provide an apparatus and a method for providing remote control at a mobile communication terminal, which is adapted to either one of transmit or receive data for storage to or from a counterpart mobile terminal without leaving a remote control mode.

Still another aspect of the present invention is to provide an apparatus and a method for providing remote control at a mobile communication terminal, for improving the convenience of receiving or transmitting a desired data for storage.

In accordance with an aspect of the present invention, an apparatus for remotely controlling a mobile communication terminal is provided. The apparatus includes a display unit for causing a remote control screen to be displayed during a remote control event, a communication unit for one of either transmitting or receiving a remote control signal to or from, respectively, an object terminal as well as data for storage during occurrence of a remote control event, a remote control processor for processing the remote control signal received from the communication unit and controlling one of the to transmitting or receiving of data for storage, and a controller for controlling the remote control processor according to the remote control signal said controller transmitting a storage data transmission or reception request message to the object terminal in response to a transmission or reception request for the storage of data.

In accordance with another aspect of the present invention, a method for remote controlling between two terminals using apparatus having the above construction is provided.

In accordance with still another aspect of the present invention, a method for providing remote control at a control terminal for remotely controlling a controlled terminal. The method includes, upon detecting occurrence of a remote control event, generating a remote control request message at said control terminal and transmitting the same to a controlled terminal, upon receiving a remote control allow message from the controlled terminal, outputting at said control terminal screen and voice information received from the controlled terminal, determining whether a reception request for storage data exists in the screen information that was output, and upon determining that the reception request for storage data exists, receiving relevant storage data from the controlled terminal.

In accordance with further another aspect of the present invention, a method for being remotely controlled at a controlled terminal in response to remote control from a control terminal is provided. The method includes, upon receiving a remote control request message from the control terminal, generating a remote control allow message at the controlled terminal, transmitting the same to the control terminal, and also transmitting to the control terminal video and voice information in real-time, determining at the controlled terminal whether a storage data request message is received from the control terminal, and if the storage data request message is received, determining whether transmission is allowed or not, and if allowed, transmitting storage data to the control terminal.

Furthermore, according to an exemplary embodiment of the present invention, a controlled terminal may receive a transmission request of storage data, but may transmit storage data of the controlled terminal to a control terminal.

In accordance with yet another aspect of the present invention, a method for being remotely controlled at a controlled terminal in response to remote control between from a control terminal, is provided. The method includes, upon receiving a remote control request message from the control terminal, generating a remote control allow message at the controlled terminal, transmitting the same to the controlled terminal, and transmitting video and voice information in real-time to the control terminal, determining whether a transmission request for transmitting storage data to the control terminal exists, and if the transmission request exists, transmitting relevant storage data to the control terminal.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
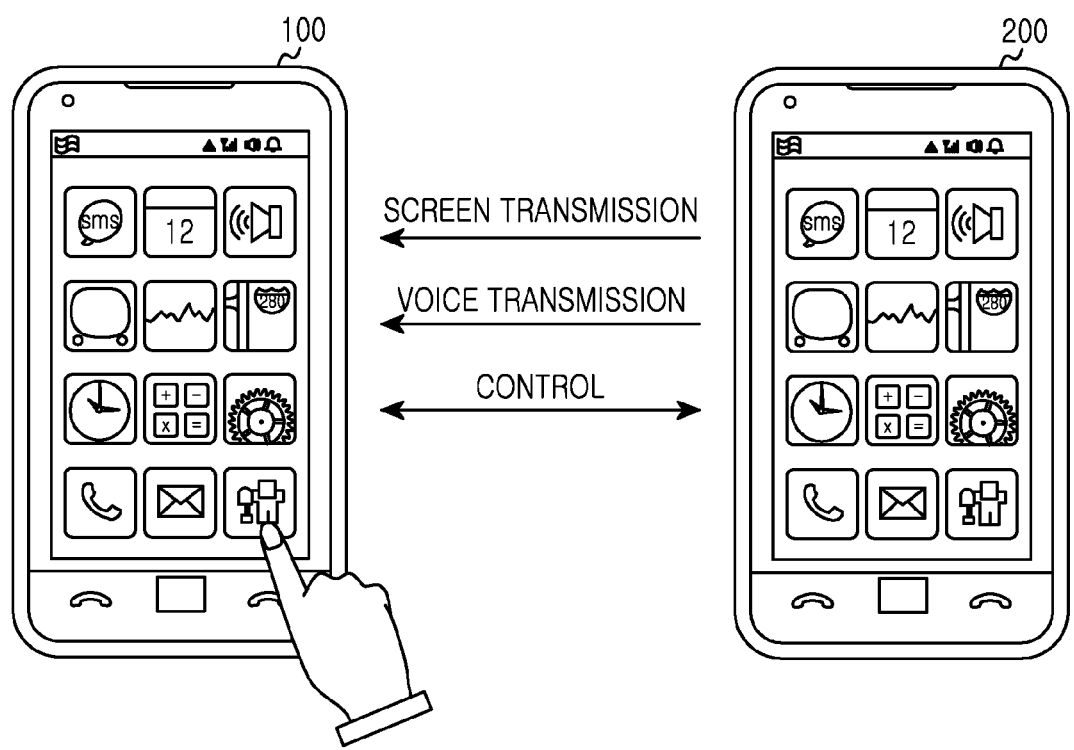
FIG. 1 is a schematic view illustrating a remote control function between mobile terminals according to an exemplary embodiment of the present invention.

FIG. 1 is a schematic view illustrating a remote control function between terminals according to an exemplary embodiment of the present invention. Screen and voice transmission may be performed between a host terminal and a client terminal. The host terminal is hereinafter called a control terminal 100 and the client terminal is hereinafter called a controlled terminal 200.

The two terminals 100 and 200 have the same basic construction. A terminal that sends a remote control request serves as a control terminal, and a terminal that shares its screen serves as a controlled terminal.

Therefore, when receiving a remote control request from the control terminal 100, the controlled terminal 200 accepts the remote control request via an authentication process, and performs current screen and voice sharing. Therefore, the screen of the controlled terminal 200 is displayed in the control terminal 100, and the control terminal 100 may control the controlled terminal 200.

Figure 2:
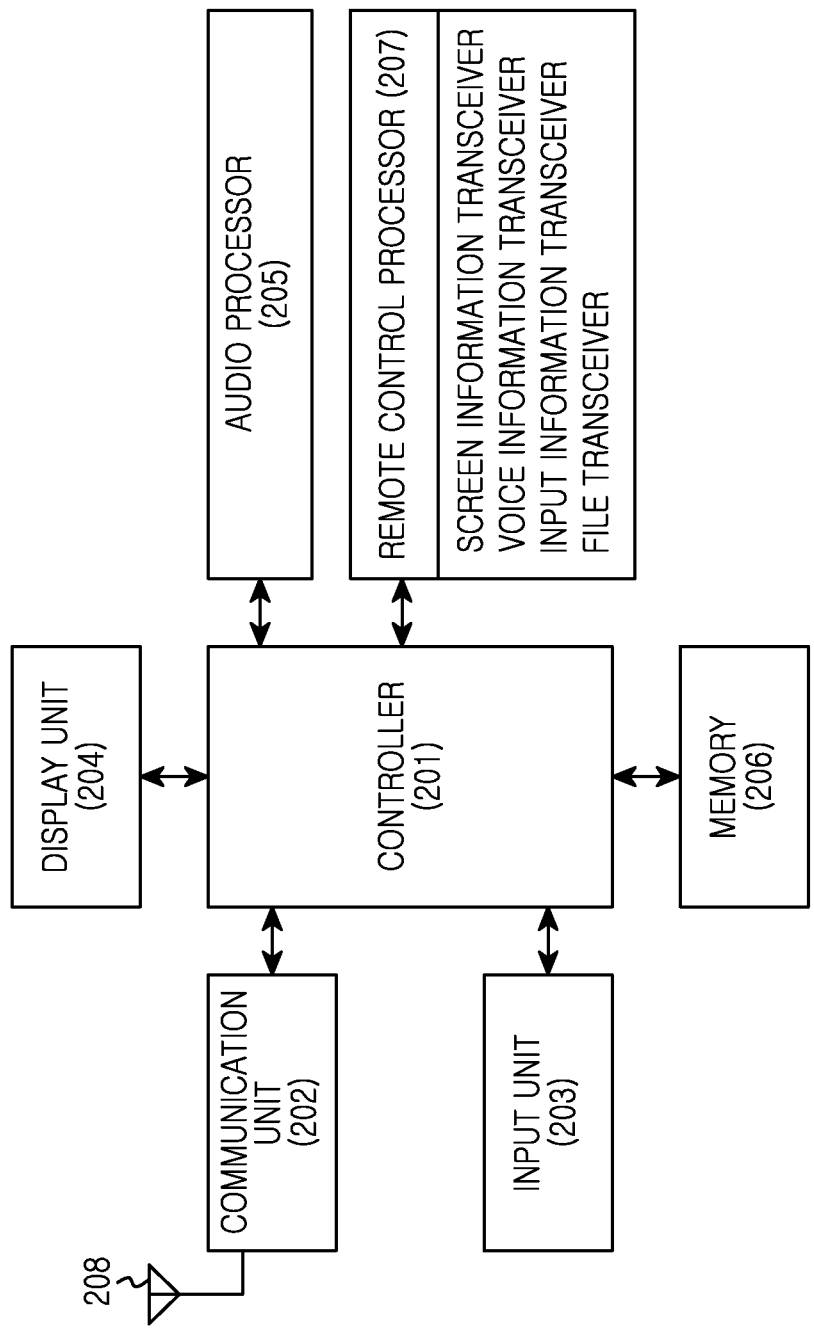
FIG. 2 is a block diagram illustrating a mobile communication terminal having a remote control function according to an exemplary embodiment of the present invention.

FIG. 2 is a block diagram illustrating a mobile communication terminal having a remote control function according to an exemplary embodiment of the present invention. The mobile communication terminal includes a controller 201, a communication unit 202, an input unit 203, a display unit 204, an audio processor 205, a memory 206, and a remote control processor 207.

During reception, the communication unit 202 down-converts a Radio Frequency (RF) signal received via an antenna, despreads and then channel-decodes the received signal. During transmission, the communication unit 202 channel-codes and spreads data, up-converts the data and then transmits the data via the antenna 208. In addition, according to an exemplary embodiment of the present invention, the communication unit 202 is used for transmitting/receiving a remote control signal and for the storage of data.

The communication unit 202 may use a wireless communication network such as the general Code Division Multiple Access (CDMA) but is not limited thereto, and in fact other types of communication networks could be used, including short distance universal wireless communication networks, such as WiFi.

The input unit 203 receives input information for controlling the controlled terminal 200 as well as the control terminal 100 from a user via a keypad or a touch screen, as was shown in FIG. 1.

The display unit 204 displays state information (for example, an indicator while a file is being saved, etc.) occurring during a remote operation of the terminal, a limited number of numbers and characters, moving images, still images, etc. In addition, according to an exemplary embodiment of the present invention, the display unit 204 may display an image originated by the controlled terminal, or display a file reception request message, etc. received from a counterpart terminal. Furthermore, the display unit 204 may display a control screen layer that only a user of the terminal may view together as well as a share screen layer shared by two terminals.

The display unit 204 may be a touch screen including a high quality Liquid Crystal Display (LCD).

The audio processor 205 includes a speaker unit for outputting sounds, and transmits/receives voice in response to a request of the remote control processor 207 according to an exemplary embodiment of the present invention.

The memory 206 stores a program for controlling an overall operation of the control terminal, an application program, storage data (phone number, an SMS message, a compressed image file, moving images, etc.). According to an exemplary embodiment of the present invention, the memory 206 stores storage data (file, etc.) of the controlled terminal.

When detecting a remote control event (by a user, or a remote control signal received from the control terminal 100), the remote control processor 207 enters a remote control mode. The remote control processor 207 includes a screen information transceiver, a voice information transceiver, an input information transceiver, and a file transceiver.

The screen information transceiver encodes currently displayed screen information and transmits the same to the control terminal 100, and decodes screen information received from the controlled terminal 200 and displays the same via the display unit 204.

The voice information transceiver encodes currently received voice information and transmits the same to the controlled terminal 200, and decodes voice information received from the control terminal 100 and outputs the same via the audio processor 205.

The input information transceiver transmits input information currently input by a user to the controlled terminal 200, and transfers input information received from the control terminal 100 to a controller of a terminal to perform a relevant function.

The file transceiver may receive data (file, etc.) of the controlled terminal 200, or transmit the data to the control terminal 100.

Preferably, when detecting a request for receiving data of the controlled terminal 200, the remote control processor 208 transmits a reception agreement request message to the controlled terminal 200. In addition, when detecting a transmission request for transmitting data of the terminal to an object terminal, the remote control processor 208 transmits a transmission agreement request message to the object terminal.

The controller 201 controls an overall operation of the terminal and simultaneously, may control the operation of a screen of the controlled terminal in real-time by controlling the display unit and the audio processor using screen and voice information input from the remote control processor 207. In addition, the controller 201 stores storage data (file, etc.) received from the controlled terminal 200 in the memory 206.

Figure 3:
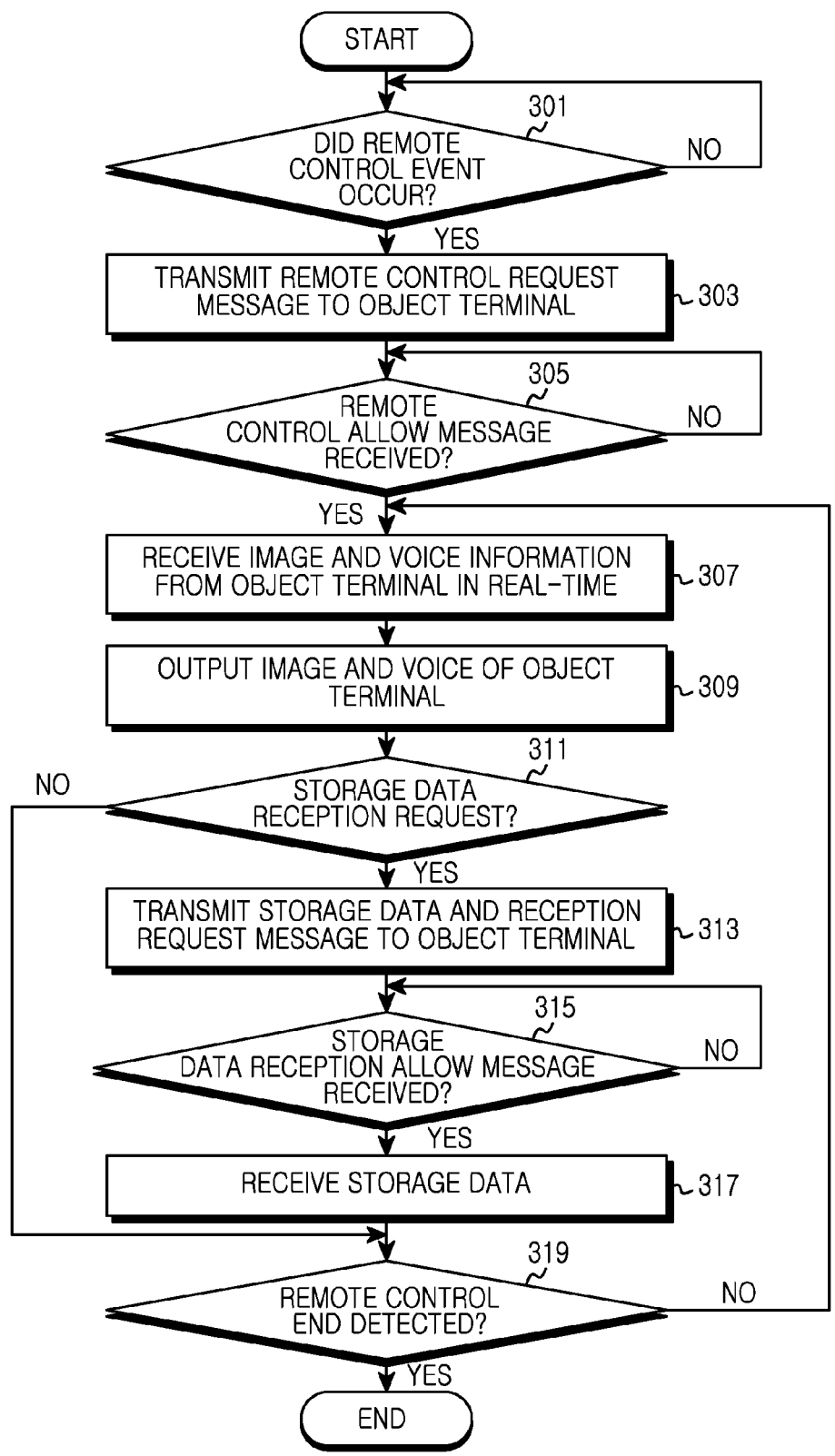
FIG. 3 is a flowchart illustrating a process for receiving storage data via a remote control of a control terminal according to an exemplary embodiment of the present invention.

FIG. 3 is a flowchart illustrating a process for receiving a file via remote control of a control terminal according to an exemplary embodiment of the present invention, and FIG. 6 is an exemplary view illustrating a file transmission/reception procedure via remote control of a terminal according to an exemplary embodiment of the present invention.

As illustrated in FIGS. 3 and 6, a control terminal determines whether a remote control event occurs during an operation in step 301 The control terminal transmits a remote control request message to an object terminal (a controlled terminal) in step 303. When a remote control accept message is received in step 305, the control terminal receives image and sound information in real-time from the object terminal in step 307. Thus, the remote control processor of the control terminal receives screen and voice information of the controlled terminal in real-time using a screen information transceiver, a voice information transceiver, an input information transceiver, and a file transceiver under control of the controller 201 of FIG. 2. Of course, though not shown, the control terminal may control a screen of the controlled terminal via the input information transceiver.

The control terminal determines whether a file reception request by a user exists in step 311. When the file reception request occurs, the control terminal automatically transmits a file reception agreement request message to the object terminal (controlled terminal) in step 313. That is, a file reception agreement request message is used when the user intends to receive desired storage data (file, etc.) on the currently displayed screen of the controlled terminal via the control terminal. In this case, the file reception agreement request message is for obtaining a file reception agreement from a user of the controlled terminal. This step is for preventing in advance the control terminal from receiving data inadvertently and without prior acceptance by the user of the controlled terminal.

Figure 6B:
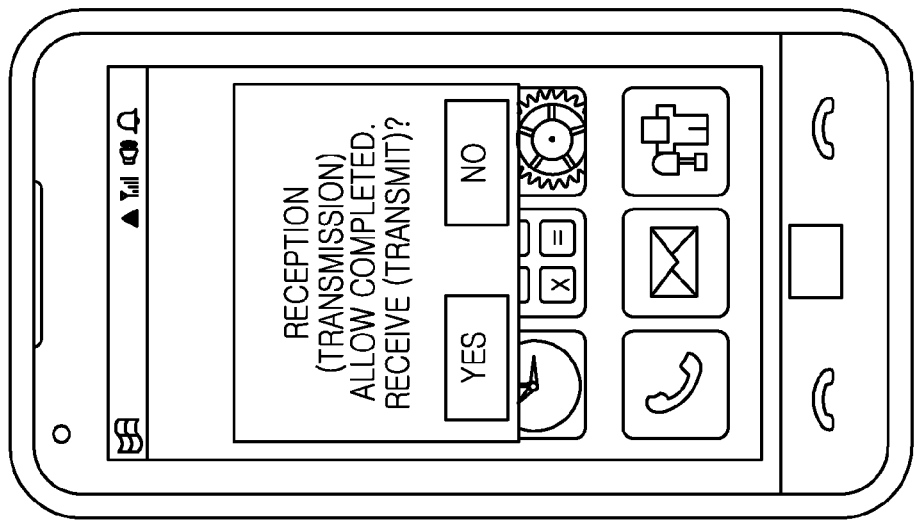
FIG. 6 is an exemplary view illustrating a storage data transmission/reception procedure via a remote control of a terminal according to an exemplary embodiment of the present invention.
Figure 6A:
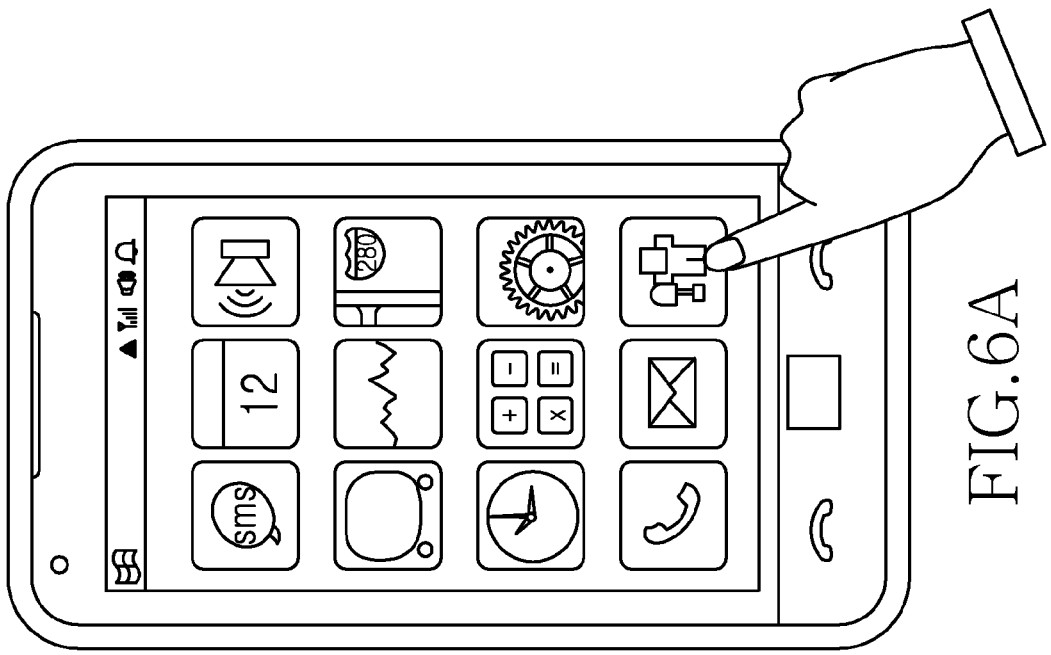
Figure 6D:
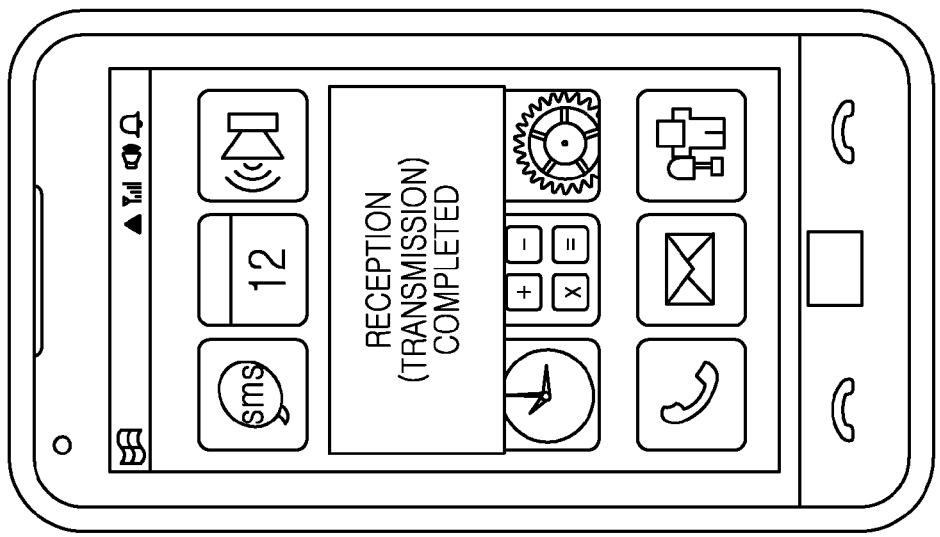
Figure 6C:
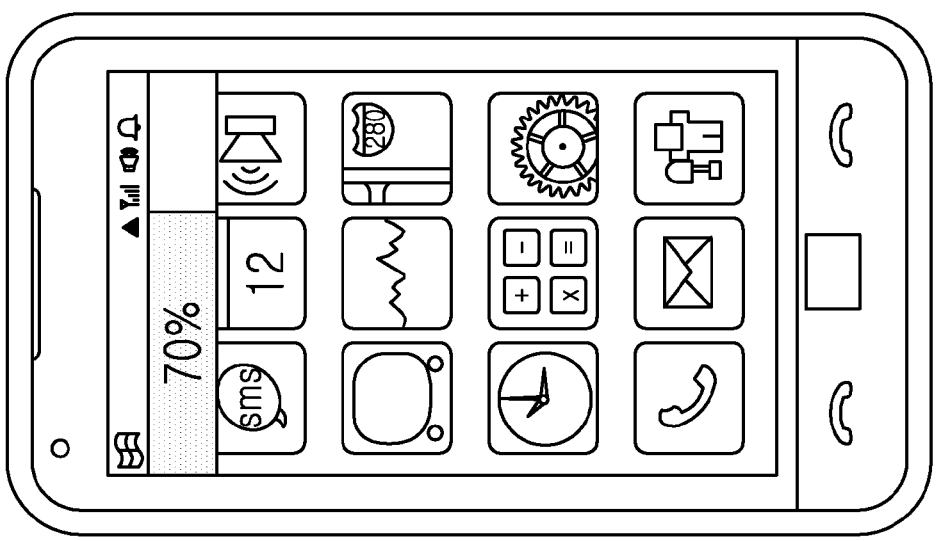

More specifically, as illustrated in FIGS. 6A to D, a user performs an input operation on a control terminal in order to receive a desired file, for example, on a reception screen of a controlled terminal. At this point, the user may touch the relevant screen or file in various methods, or may manipulate the screen or file using a navigation key button in the case where a touch screen is not provided. In case of a touch method, the user may represent file reception intention by pressing the relevant file for a predetermined period of time, or by pressing two times successively, or by pressing a separate special key (as shown in FIG. 6A).

When receiving a file reception agreement message from the controlled terminal in step 315, the control terminal automatically receives the file in step 317. That is, as illustrated in FIG. 6B, a reception (transmission) allow complete message and a reception YES or NO message from the controlled terminal are displayed. This transmission/reception YES or NO message may pop-up independently as a control screen layer on the control terminal. Thereafter, as shown on the screen of FIG. 6C, an indicator representing a file reception state of a predetermined object is displayed, and this indicator may also be simultaneously displayed on the controlled terminal. Thereafter, as shown on the screen of FIG. 6D, a reception (transmission) complete message may be displayed. When detecting a remote control end in step 319, the control terminal ends all steps.

Figure 4:
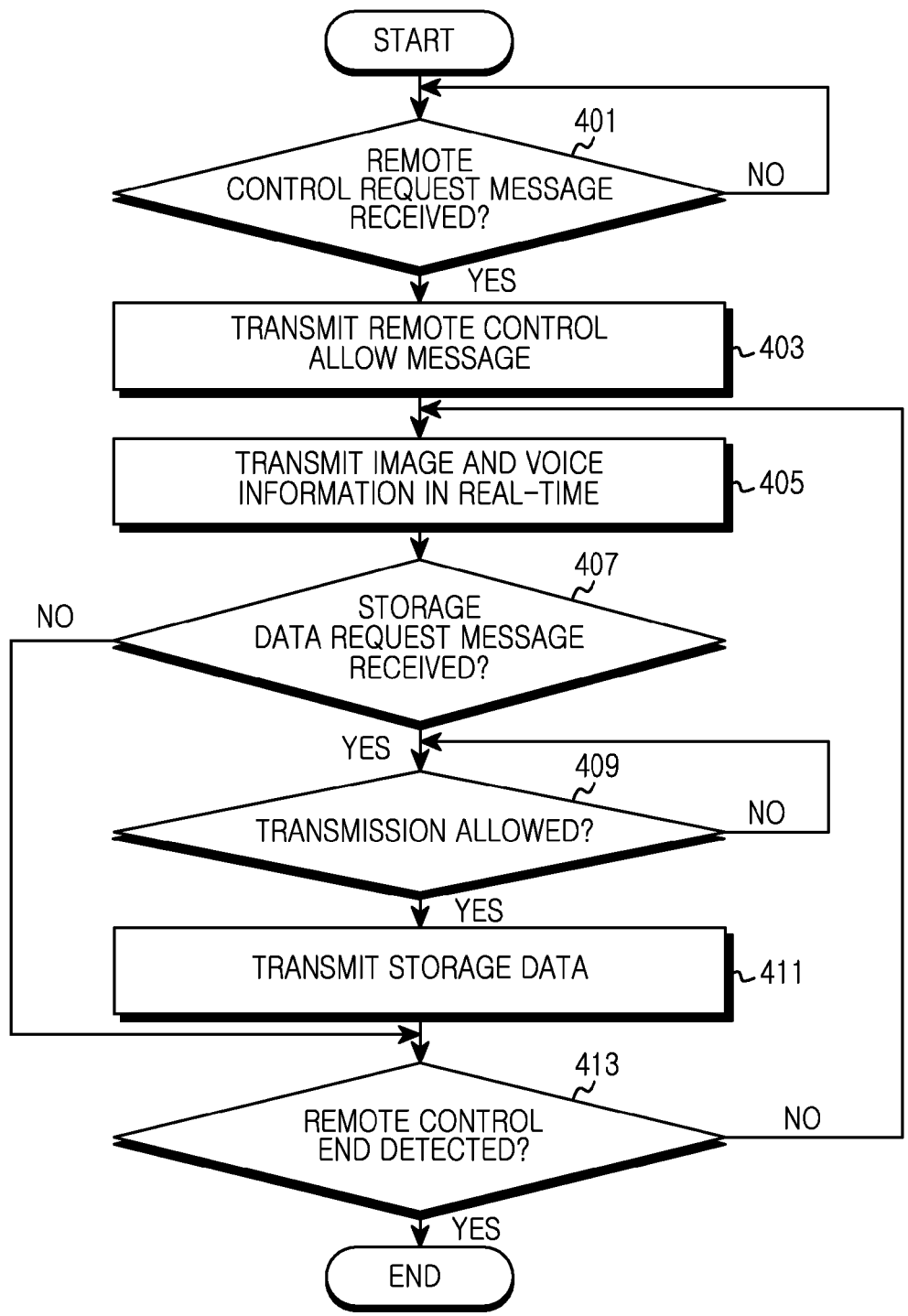
FIG. 4 is a flowchart illustrating a process for transmitting storage data via a remote control of a controlled terminal according to an exemplary embodiment of the present invention.

FIG. 4 is a flowchart illustrating a process for transmitting storage data via a remote control of a controlled terminal according to an exemplary embodiment of the present invention.

In step 401, the controlled terminal determines whether a remote control request message is received from a control terminal. In step 403, upon receiving the remote control request message, the controlled terminal transmits a remote control allow message In step 405, the controlled terminal transmits image and sound information to the control terminal in real-time.

The controlled terminal determines whether a file storage request message is received from the control terminal in step 407. Upon receiving the file storage request message, the controlled terminal determines whether to allow transmission in step 409. If the transmission is not allowed, the control terminal may control a screen of the controlled terminal but will not be able to receive storage data (file, etc.) from the controlled terminal. If the transmission is allowed, the controlled terminal transmits a file in step 411, and upon detecting a remote control end in step 413, the controlled terminal ends all steps.

Figure 5:
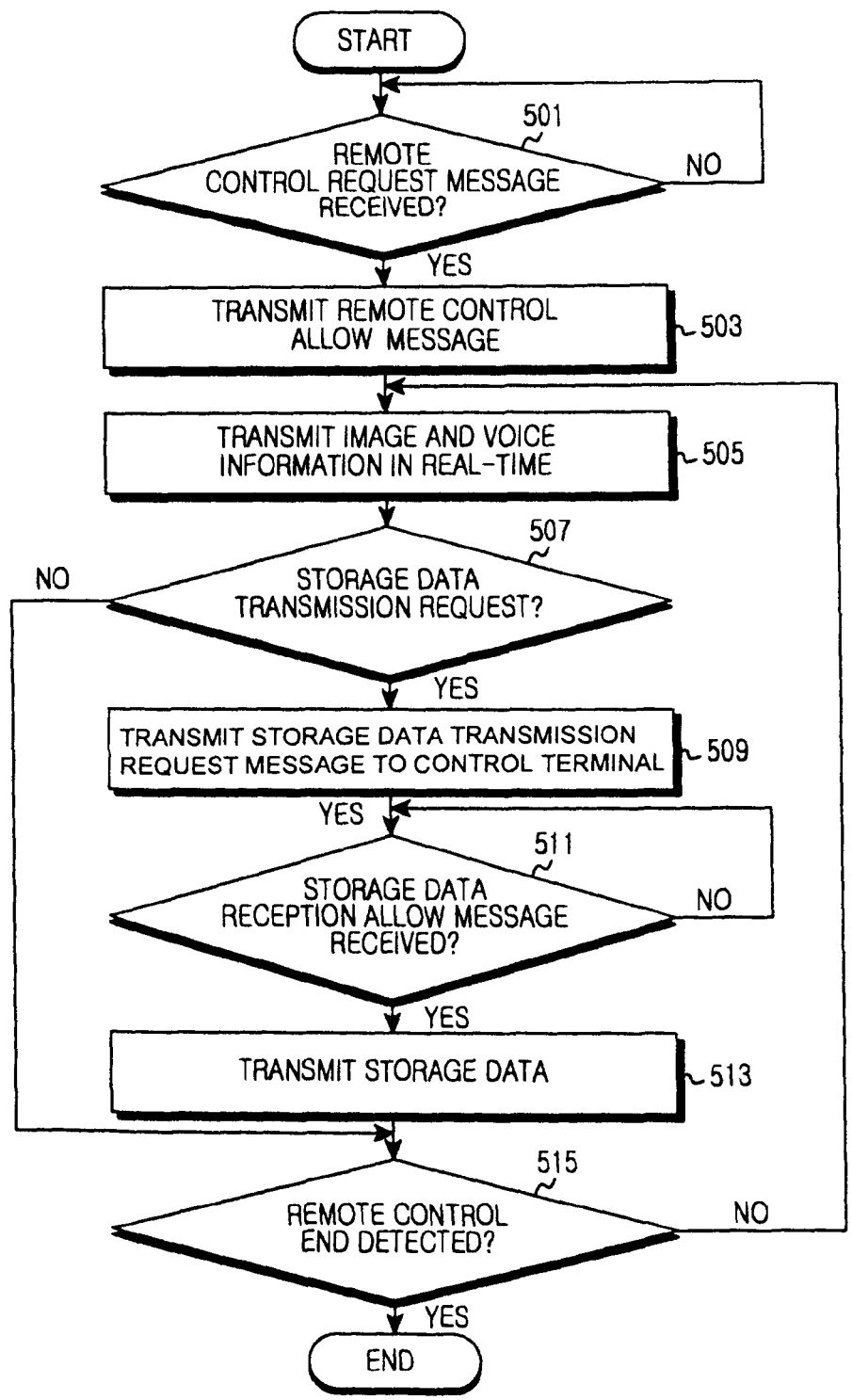
FIG. 5 is a flowchart illustrating a process for transmitting storage data via a remote control of a controlled terminal according to an exemplary embodiment of the present invention.

FIG. 5 is a flowchart illustrating a process for transmitting a file via remote control of a controlled terminal according to an exemplary embodiment of the present invention.

Assuming that FIG. 4 is a flowchart illustrating a method where a controlled terminal receives a file reception request from a control terminal, FIG. 5 illustrates a method for transmitting, from a controlled terminal, relevant storage data to a control terminal, upon acceptance of a file transmission request.

Since steps 501 to 505 are the same as relevant steps of FIG. 4, description thereof is omitted.

If a file transmission request from the controlled terminal to the control terminal is desired in step 507, the controlled terminal transmits a file reception request message to the control terminal in step 509. Upon receiving a file reception agreement message in step 511, the controlled terminal transmits the file in step 513, and upon detecting a remote control end in step 515, the controlled terminal ends all steps.

Figure 7C:
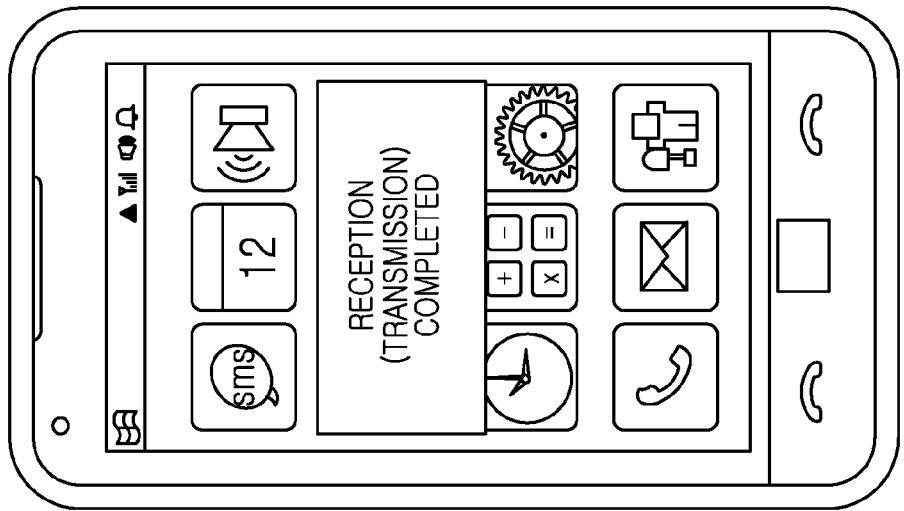
FIG. 7 is an exemplary view illustrating a transmission/reception agreement procedure screen of storage data via a remote control of a terminal according to an exemplary embodiment of the present invention.
Figure 7B:
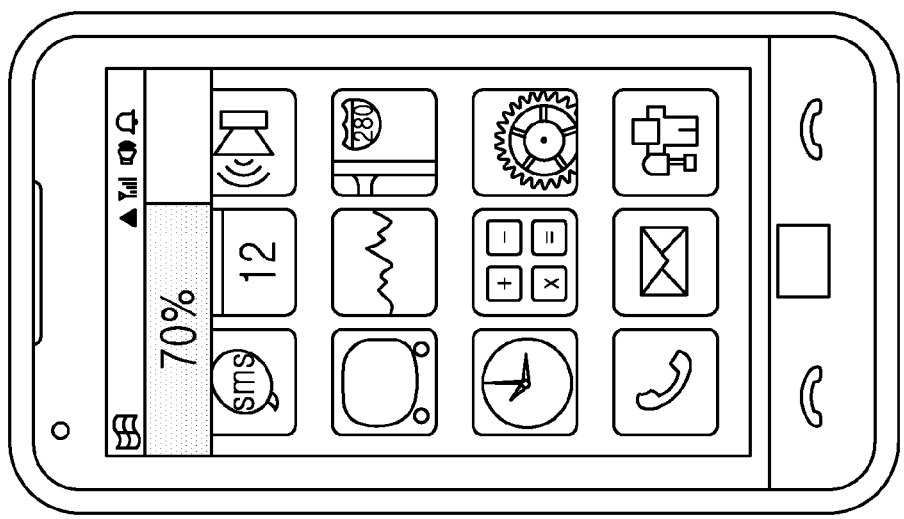
Figure 7A:
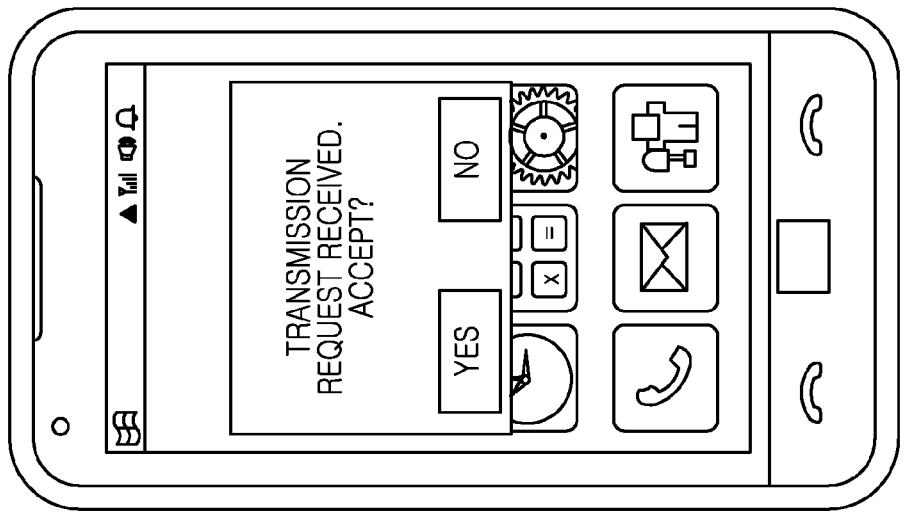

FIG. 7 is an exemplary view illustrating a transmission/reception agreement procedure screen for storage data via a remote control of a terminal according to an exemplary embodiment of the present invention. More specifically, FIG. 7 is an exemplary view illustrating an embodiment where a control terminal receives a file transmission request from a controlled terminal, or an embodiment where a controlled terminal receives a file transmission (reception) request from a control terminal. As shown in FIG. 7A, the controlled terminal receives a transmission request message from a counterpart terminal during remote control. In this embodiment, upon accepting the transmission request, the controlled terminal transmits a relevant file to the control terminal. At this point in time, a file transmission/reception state is displayed by a separate indicator shown in FIG. 7B, and a reception (transmission) complete message is displayed as in FIG. 7C.

Figure 8B:
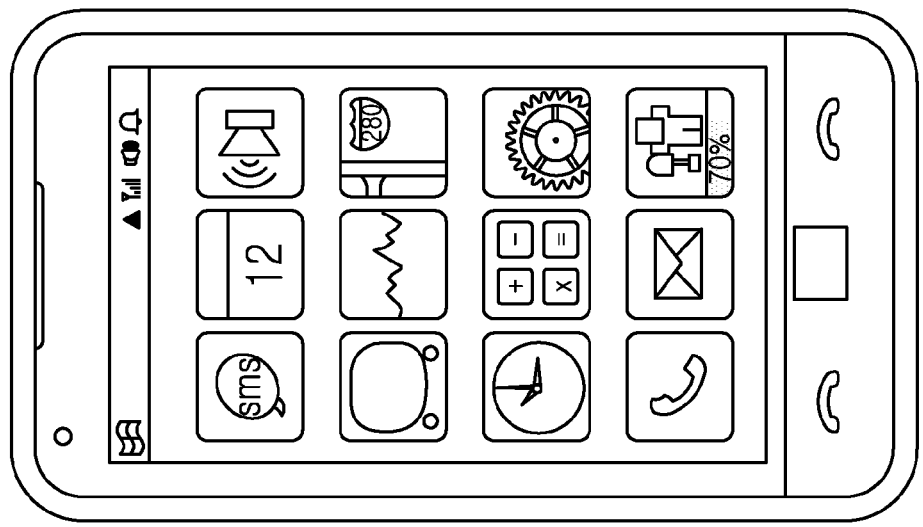
FIG. 8 is an exemplary view illustrating various storage data transmission/reception screens of a terminal according to an exemplary embodiment of the present invention.
Figure 8A:
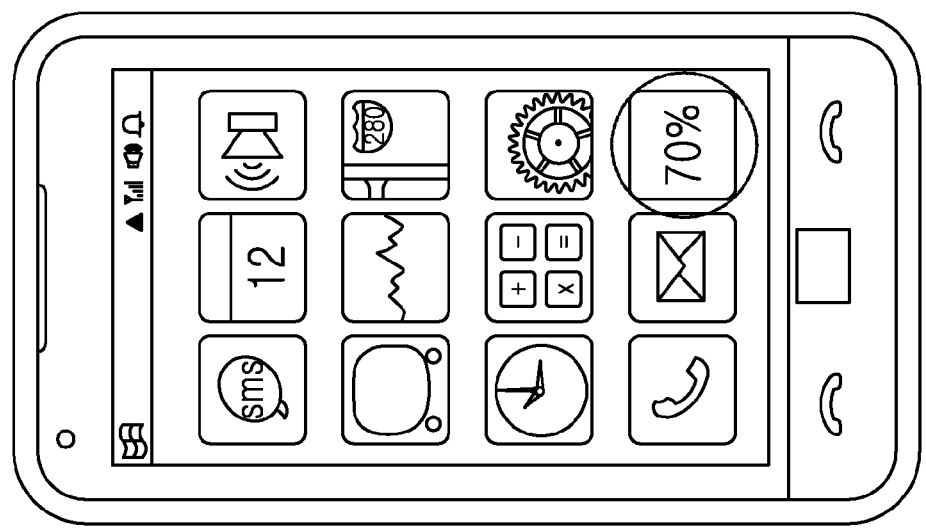

FIG. 8 is an exemplary view illustrating various file transmission/reception screens of a mobile communication terminal according to an exemplary embodiment of the present invention. FIG. 8A shows in the lower right corner an indicator representing a file transmission state that may be displayed as a number in a circle on a relevant file, or may be displayed as a number in a bar (or as a bar graph) under a relevant file.

Thus, in accordance with an exemplary embodiment of the invention, an apparatus and a method is provided for remotely controlling a mobile communication terminal so that storage data can be at least one of transmitted or received between the mobile terminals even during a remote control operation, thereby increasing the usage convenience of the terminal.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An apparatus for use in a first mobile communication terminal, for remotely controlling a second mobile communication terminal, the apparatus comprising: a display unit including a touch screen, for causing a remote control screen of the second terminal to be displayed during a remote control event, wherein a standard screen of the first terminal is replaced by the remote control screen, the remote control screen containing icons concurrently displayed on the second terminal and selectable via the touch screen, with each of the icons having a visual appearance of a different type of application than each of the other icons, the application containing transferrable file data; a wireless communication unit for wirelessly transmitting remote control signals to, and receiving file data from, the second terminal during the remote control event; a remote control processor for processing the remote control signals transmitted by the communication unit; an audio processor for processing voice information transmitted from the second terminal and voice information to be transmitted to the second terminal while the remote control screen is displayed: a controller for controlling the remote control processor, the wireless communication unit, the audio processor, and the display unit; and a memory for storing the received file data; wherein the apparatus is further configured to: i) transmit, to the second terminal, a file request message associated with one of the icons selected at the first terminal, and receive corresponding first file data transmitted by the second terminal following approval by the second terminal; and ii) receive, and display a prompt for, a transmission request initiated at and transmitted from the second terminal to transmit second file data, generate and transmit a reception allow message, following approval of the transmission request via detecting user selection of an acceptance choice in the prompt, and receive and store in the memory the second file data which is transmitted by the second terminal in response to the reception allow message; wherein, while the first or second file data is only partially received, the apparatus is further configured to change the display of at least a portion of the selected icon to indicate a numerical percentage of the first or second file data reception that has been completed; and wherein the numerical percentage is simultaneously displayed on both the first mobile communication terminal and the second mobile communication terminal.

2. The apparatus of claim 1, wherein the wireless communication unit comprises one of a mobile communication network, a WiFi network, and a short distance communication network.

3. The apparatus of claim 1, wherein the remote control event is a first remote control event, and the controller and remote control processor are further configured responsive to a second remote control event to operate the first terminal as a controlled terminal under the remote control of the second terminal.

4. The apparatus of claim 3, wherein the remote control processor comprises:
- a screen information transceiver for encoding currently displayed screen information for transmitting the same during the second remote control event to the second terminal, and decoding screen information received during the first remote control event from the second terminal for displaying the same via the display unit;
- a voice information transceiver for encoding currently received voice information for transmitting the same to the second terminal, and decoding voice information received from the second terminal for outputting the same via the audio processor;
- an input information transceiver for transmitting input information currently input by a user to the second terminal, and transferring input information received from the second terminal during the second remote control event to the controller so as to perform a relevant function; and
- a file transceiver for receiving file data from the second terminal during the first remote control event and transmitting file data to the second terminal during the second remote control event.

5. A method implemented at a first mobile communication terminal for remotely controlling a second mobile communication terminal, the method comprising: upon detecting occurrence of a remote control event at the first terminal, generating a remote control request message and wirelessly transmitting the same to the second terminal; upon receiving a remote control allow message from the second terminal, outputting, at a touch screen of the first terminal, screen and voice information received from the second terminal, wherein a standard screen of the first terminal is replaced by the screen information received from the second terminal, the screen information including a display of touch selectable icons, each having a visual appearance of a unique type of application containing transferrable file data; transmitting, to the second terminal, a file request message associated with one of the icons selected at the first terminal, and receiving corresponding first file data transmitted by the second terminal following approval by the second terminal; receiving, and displaying a prompt for, a transmission request initiated at and transmitted from the second terminal to transmit second file data; selectively generating and transmitting a reception allow message approving the transmission request via detecting user selection of an acceptance choice in the prompt; and receiving and storing the second file data which is transmitted by the second terminal in response to the reception allow message; and during the receiving of corresponding first or second file data transmitted by the second terminal: while the first or second file data is only partially received, changing the display of at least a portion of the selected icon to indicate a numerical percentage of the file data reception that has been completed; and wherein the numerical percentage is simultaneously displayed on both the first mobile communication terminal and the second mobile communication terminal.

6. The method of claim 5, wherein the icon is selected by determining the icon has been one of pressed for a predetermined length of time, or pressed at least two times.

7. A method for operating at an object mobile communication terminal under remote control from a control mobile communication terminal, the method comprising: upon receiving a remote control request message from the control terminal, generating a remote control allow message at the object terminal, transmitting the same to the control terminal, and also transmitting to the control terminal video and voice information in real-time; wirelessly transmitting screen information currently displayed on a touch screen at the object terminal to the control terminal, wherein a standard screen of the control terminal is replaced by the screen information currently displayed at the object terminal, including a display of touch selectable icons having a visual appearance of a different type of application than each of the other icons, the application containing transferrable file data; determining at the object terminal whether a file data request message is received from the control terminal corresponding to one of the icons selected at the control terminal; and when the file data request message is received, determining whether transmission is allowed or not, and when allowed, transmitting associated first file data to the control terminal; during the transmission of the first file data, as a numerical percentage of the total amount of file data to be transferred is transmitted, changing the display on the object terminal screen of the selected icon to indicate the numerical percentage transmitted; and wherein the numerical percentage is simultaneously displayed on both the control terminal and the object terminal; initiating a transmission request via user command at the object terminal for transmitting second file data, and transmitting the transmission request to the control terminal; and upon receiving a reception allow message from the control terminal approving the transmission request via control terminal user selection of a displayed acceptance choice therefor, transmitting relevant second file data to the control terminal.

8. The method of claim 7, further comprising, during the step of determining whether transmission is allowed or not, upon detecting the transmission is not allowed, generating a file transmission reject message and transmitting the same to the control terminal.

9. The method of claim 7, wherein the file data request message is displayed on a separate control screen layer, so that only a user of the object terminal can see a display of the file data request message.

10. A first mobile communication terminal configured to remotely control a second mobile communication terminal, the first mobile terminal comprising: a display unit including a touch screen, for causing a remote control screen of the second terminal to be displayed during a remote control event, wherein a standard screen of the first terminal is replaced by the remote control screen, the remote control screen containing icons concurrently displayed on the second terminal and selectable via the touch screen, with each of the icons having a visual appearance of a different type of application than each of the other icons, the application containing transferrable file data; a wireless communication unit for wirelessly transmitting remote control signals to, and receiving file data from, the second terminal during a remote control event; a memory for storing the file data; an audio processor for processing voice information transmitted from the second terminal and voice information to be transmitted to the second terminal while the remote control screen is displayed; and a controller for processing the remote control signals, wherein the controller is configured to: i) transmit, to the second terminal, a file request message associated with one of the icons selected at the first terminal, and receive corresponding first file data transmitted by the second terminal following approval by the second terminal; and ii) receive, and display a prompt for, a transmission request initiated at and transmitted from the second terminal to transmit second file data, generate and transmit a reception allow message, following approval of the transmission request via user selection of an acceptance choice in the prompt, and receive and store in the memory the second file data which is transmitted by the second terminal in response to the reception allow message;

wherein, while the first or second file data is only partially received, the apparatus is further configured to change the display of at least a portion of the selected icon to indicate a numerical percentage of the first or second file data reception that has been completed; and wherein the numerical percentage is simultaneously displayed on both the first mobile communication terminal and the second mobile communication terminal.

\* \* \* \* \*